A. WORK & R. J. GILMORE.
HOSE-COUPLING.
No. 175,232.  Patented March 21, 1876.
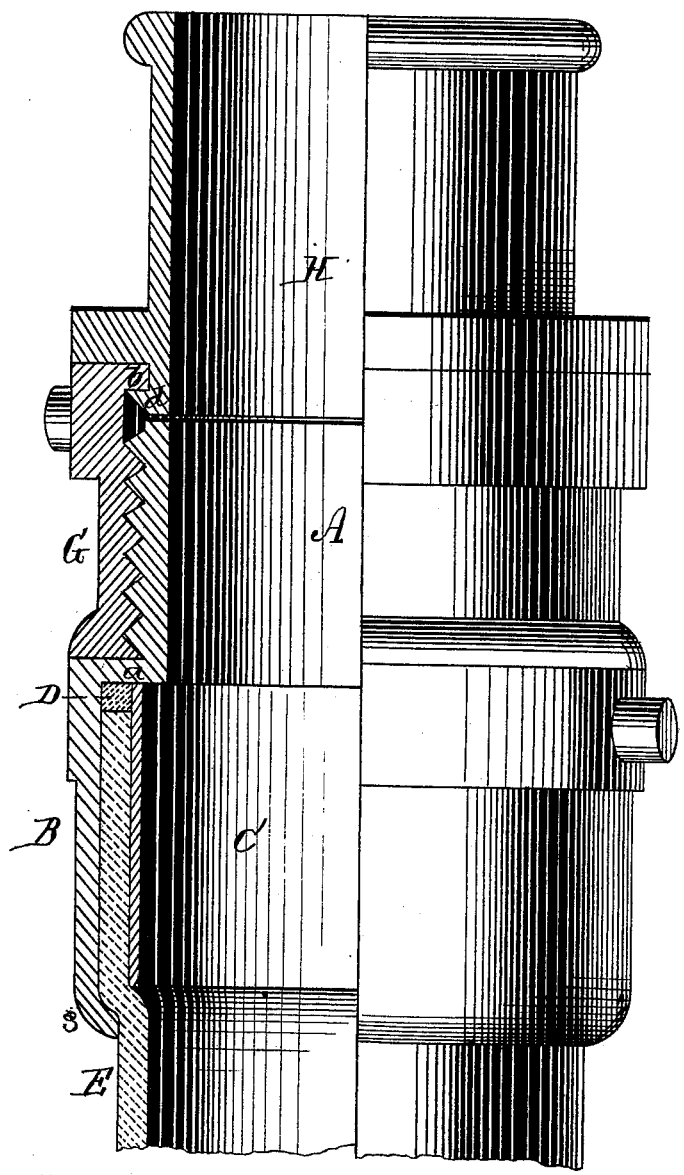
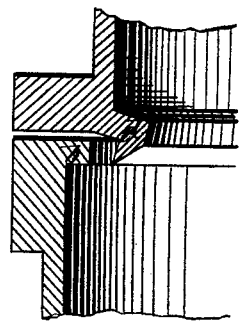
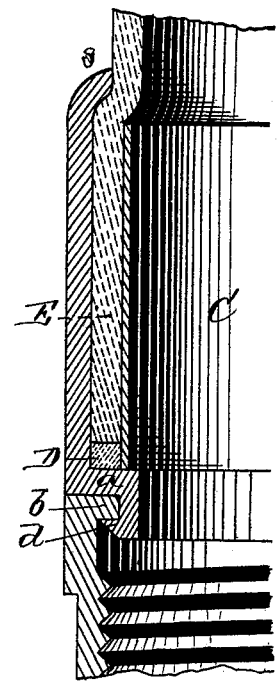

UNITED STATES PATENT OFFICE.

ALANSON WORK AND ROBERT J. GILMORE, OF PROVIDENCE, R. I.

IMPROVEMENT IN HOSE-COUPLINGS.

Specification forming part of Letters Patent No. 175,232, dated March 21, 1876; application filed February 12, 1876.

*To all whom it may concern:*

Be it known that we, ALANSON WORK and ROBT. J. GILMORE, of Providence, in the county of Providence and State of Rhode Island, have invented a new and valuable Improvement in Hose-Couplings; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal section of our hose-coupling, and Figs. 2 and 3 are sectional detail views thereof.

The nature of our invention consists in the construction and arrangement of a hose-coupling, and in the method of attaching the swivel therein, as will be hereinafter more fully set forth.

In the accompanying drawing, A represents the male screw of the hose coupling, either cast in one piece with, or secured to, the encompassing band B, so constructed as to form an interior circumferential shoulder, a, near one end, and a shoulder, s, at the other. C is an interior ring of lead, copper, or other suitable ductile metal, between which and the band B the hose is firmly clamped by the expansion of said interior ductile ring C, which is accomplished by the application of a tapering mandrel, or any other suitable mechanical means. If the hose were left to come up against the shoulder a of the band B, it would permit the water to penetrate to the fabric, causing it to decay speedily, and also causing leakage. To obviate this difficulty, we place a packing-ring, D, of rubber or other suitable elastic material, inside of the band against the end of the hose E, forming, virtually, a continuation of the hose. The inner ring C is expanded against this ring D, and the hose at the same time thereby tightly compressing the rubber ring and forming a water-tight joint. A similar packing-ring is inserted and fastened in the same manner at the other end of the coupling. G represents the female part of the coupling, having the encompassing band H swiveled therein. This female part G is provided with the shoulder or swivel b, as shown. The band H is provided with the retaining-shoulder d for securing the swivel. This shoulder is cast with the band in the taper form, shown in Fig. 3, or in any other suitable form that will answer the same purpose. The swivel is then placed over said shoulder, and said shoulder then expanded into interlocking position with the swivel b, as shown both in Figs. 1 and 2. This expansion may be effected by drawing a tapering plug through it, or otherwise.

This method of attaching the swivel is easy of execution, and the surfaces to come in contact may be turned smooth in a lathe before connecting them, thus making a fine and nice job.

It will be seen that when the interior ring is expanded it clamps the hose at the shoulder s, thereby holding the same firmly.

What we claim as new, and desire to secure by Letters Patent, is—

1. The independent elastic packing-ring D, in combination with the encompassing band, having interior shoulder a, the hose, and the expansible ring, substantially as and for the purposes herein set forth.

2. The encompassing band of a hose-coupling, formed with a shoulder, d, constructed as described, to be expanded for securing the swivel to the band, as herein set forth.

3. The method, herein described, of attaching the swivel in a hose-coupling by expanding the retaining-shoulder into interlocking position with the swivel, as herein set forth.

In testimony that we claim the above we have hereunto subscribed our names in the presence of two witnesses.

ALANSON WORK.
ROBT. J. GILMORE.

Witnesses:
JOHN C. PURKIS,
HENRY MARTIN.